3,257,373
IMPROVING RUBBER PROCESSABILITY
Gerard Kraus and Kent W. Rollmann, Bartlesville, Okla., assignors to Phillips Petroleum Company, a corporation of Delaware
No Drawing. Filed June 11, 1962, Ser. No. 201,284
7 Claims. (Cl. 260—94.7)

This invention relates to a method of improving the processability of rubber by incorporating a peptizer and masticating the mixture.

In processing natural rubber and synthetic rubber derived from conjugated dienes mechanical working in the presence of air or oxygen ordinarily leads to at least some breakdown of the molecular structure of the rubber, thereby improving its processability. The extent of this change is influenced by time, temperature and the vigor of the mechanical working. With some types of rubber the desired changes can be achieved only after prolonged treatment which is frequently accompanied by cross-linking and other detrimental changes. In order to reduce time and power required to improve the processability and prevent deterioration of the rubber during extended milling operations a chemical agent, known as a peptizer, can be incorporated to accelerate the effect of a mechanical working on the polymer. Examples of chemical additives which have been used for this purpose include aryl mercaptans, phenyl hydrazine, pentachlorothiophenol, diaryl disulfides, certain organic sulfonates and the like. While many of these additives have proven fairly effective they have not been without certain drawbacks encountered in their use, such as toxicity to operators, disagreeable odor or odor development in the rubber, excessive cost, and the like.

We have now discovered a class of chemicals which are highly effective peptizers for rubber but which do not possess disadvantages associated with peptizing agents of the prior art. The peptizing agents of our invention are the cadmium salts of aryl or alkaryl carbothioic acids. These additives can be employed at low levels and do not create an odor problem in handling or use. This peptizing agent is incorporated in the rubber which is then milled in a conventional rubber masticator or mixer in the presence of oxygen. While the mixing time is dependent to some extent on the temperature and the vigor of the mixing action, it is normally preferred that the mixing be carried out for at least 3 minutes.

It is an object of our invention to provide an improved method of treating rubber to improve its processability. Another object is to provide a method of using an improved peptizer which can be incorporated into the rubber to enhance the improvements in processability on mastication. Other objects, advantages and features of our invention will be apparent to those skilled in the art from the following discussion.

The materials which can be treated by our invention include natural rubber and synthetic polymers of conjugated dienes. Such conjugated dienes normally contain from 4 to 12 carbon atoms per molecule and those containing from 4 to 8 carbon atoms are preferred. Examples of such conjugated dienes include 1,3-butadiene, isoprene, piperylene, 1,3-octadiene, 4,5-diethyl 1,3-octadiene, and the like. The polymers of conjugated dienes include not only the homopolymers of these dienes and copolymers of the dienes with each other but also copolymers of conjugated dienes in major amount with other copolymerizable monomers such as styrene, 1-vinylnaphthalene, 2-methyl-5-vinylpyridine, methyl methacrylate, acrylonitrile, and the like. Our invention is particularly valuable and we prefer to practice it with polybutadienes having relatively high cis-1,4-configuration, for example those having at least 75 percent cis-content. Polybutadienes of this type are frequently produced having inherent viscosities between 2.3 and 3.0 and it is highly desirable that such polymers be treated in order to reduce their inherent viscosity to a value in the range of about 1.7 to 2.3 for the sake of improved processability.

Inherent viscosity is determined by placing 0.1 gram of polymer in a wire cage in 100 milliliters of toluene and allowing the polymer to stand at room temperature (about 25° C.) for 24 hours. The cage is then removed and the solution filtered through a sulfur absorption tube of grade C porosity to remove solid particles. The solution is then passed through a Medalia-type viscometer at 25° C., the viscometer having been calibrated with toluene. The inherent viscosity is calculated by dividing the natural logarithm of the relative viscosity by the weight of the original sample. The relative viscosity is the ratio of the viscosity of the polymer solution to that of toluene.

The microstructures of the polymers are determined by dissolving a sample of the polymer in carbon disulfide to form a solution of 25 grams of polymer per liter of solution. Using a commercial infrared spectrometer the infrared spectrum of the solution (percent transmission) is then determined.

The percent of the total unsaturation present as trans 1,4- is calculated according to the following equation and consistent units:

$$\epsilon = \frac{E}{tc},$$

where $\epsilon$=extinction coefficient (liters-mols$^{-1}$-centimeters$^{-1}$); $E$=extinction (log $I_0/I$); $t$=path length (centimeters); and $c$=concentration (mols double bond/liter). The extinction is determined at the 10.35 micron band and the extinction coefficient is 146 (liters-mols$^{-1}$-centimeters$^{-1}$).

The percent of the total unsaturation present as 1,2- (or vinyl) is calculated according to the above equation, using the 11.0 micron band and an extinction coefficient of 209 (liters-mols$^{-1}$-centimeters$^{-1}$).

The percent of the total unsaturation present as cis 1,4- is obtained by subtracting the trans 1,4- and 1,2- (vinyl) determined according to the above procedure from the theoretical unsaturation, assuming one double bond per each $C_4$ unit in the polymer.

The compounds which are used as peptizing agents in our invention can be represented by the following general formula:

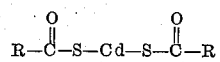

wherein each R is an aryl radical such as phenyl or naphthyl or an alkyl-substituted phenyl or naphthyl radical. There should not be more than three alkyl substituents on each aryl radical but they can collectively contain up to six carbon atoms. We prefer that the alkyl substituent, if any, be a methyl group and it is even further preferred that there be only one methyl group per aryl radical. Typical examples of suitable peptizing agents falling within the general formula are: cadmium thiobenzoate, cadmium thio-1-naphthenate, cadmium thio-2-naphthenate, cadmium thio-p-methylbenzoate, cadmium thio-m-diisopropylbenzoate, cadmium 2,4-dimethyl-thiobenzoate, cadmium 3,3'-dimethyl-thio-1-naphthenate, and the like.

The amount of additive used is normally about 0.5 to 3.0 parts by weight per 100 parts polymer. Highly effective results can be obtained using about 1 to 2 parts of peptizing agent per 100 parts polymer. The additive is incorporated in any effective milling or mixing device such as a masticator, a Banbury mixer, roll mill, or the like. The mastication is carried out in the presence of air and in most conventional rubber processing equipment the duration of the mastication will be in the range of about 5 to 15 minutes.

The advantages of our invention are further demonstrated by the following examples. The materials, conditions and proportions used are presented as being typical only and should not be construed to limit our invention unduly.

EXAMPLE I

Cadmium thiobenzoate was prepared by reacting equimolar quantities of benzoyl chloride and sodium sulfide nonahydrate at 30–40° C., diluting the reaction mixture with water and adding a half-molar amount of cadmium sulfate. Precipitated cadmium thiobenzoate was recovered on a filter, washed with water and ethanol and dried overnight in a vacuum oven at 40–50° C.

Cadmium thiobenzoate was added to cis-polybutadiene at the 1 phr. and 2 phr. levels and lightly milled on a 2-inch mill to obtain satisfactory dispersion. The rubbers were then masticated on a Watson and Wilson masticator at 126 r.p.m. and 194° F. in air and nitrogen.

Since Endor (zinc salt of pentachlorothiophenol plus iron phthalocyanine) is a known peptizer which has been shown to be superior to a number of previously developed peptizers, parallel runs were made using this material at the same levels. Another series was run with no additive. Tests were run 2, 5, and 10 minutes in the masticator. Dump temperature, power requirement, and inherent viscosity, gel content, and milling properties (240° F.) of the rubbers were determined. Studies were also made for changes in microstructure of the polymer samples to ascertain the degree of isomerization, if any.

The runs in which the mastication was conducted in nitrogen showed no breakdown. In all of the runs made in the presence of air the polymers contained no gel and exhibited no significant change in cis-content. The milling characteristics of the rubber to which no peptizer was added were poor. The specimens containing the peptizer and masticated for 5 and 10 minutes exhibited good characteristics on the roll mill, forming smooth tight bands on the rolls. The effect of the peptizing agents in improving processability was indicated by a reduction in inherent viscosity of the polymer and lowered power requirement as the mixing continued. This is shown in Table I.

by weight of various agents per 100 parts of polymer. The initial and final torque values as indicated by the Brabender plastograph and the dump temperature of each run are shown in the following table:

Table II

| Compound | Initial Torque | Final Torque | Dump Temp., °F. |
|---|---|---|---|
| None | 2.00 | 1.89 | 309 |
| Cadmium thio-1-naphthenate | 1.98 | 1.68 | 304 |
| Cadmium thio-2-naphthenate | 1.99 | 1.85 | 307 |
| Cadmium thio-p-methylbenzoate | 1.94 | 1.51 | 302 |

The above data show that all of the compounds tested were effective in increasing the processability of the rubber as a result of mastication.

As will be apparent to those skilled in the art from the above disclosure various modifications can be made in our invention without departing from the spirit or scope thereof.

We claim:

1. A method of improving the processability of rubber selected from the group consisting of natural rubber and conjugated diene polymers which comprises mixing with said rubber a compound having the formula

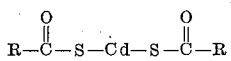

wherein each R is selected from the group consisting of phenyl, naphthyl and lower alkyl substituted derivatives thereof, and masticating the resulting mixture in the presence of air.

2. A method of improving the processability of rubber selected from the group consisting of natural rubber and conjugated diene polymers which comprises mixing with 100 parts by weight of said rubber about 0.5 to 3 parts by weight of a compound having the formula

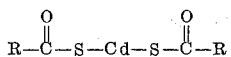

wherein each R is selected from the group consisting of phenyl, naphthyl and lower alkyl substituted derivatives

Table I
EVALUATION OF PEPTIZERS IN CIS-POLYBUTADIENE [a]

| | Cadmium Thiobenzoate, 1 phr. | | | | Cadmium Thiobenzoate, 2 phr. | | | | Endor[b], 1 phr. | | | | Endor, 2 phr. | | | | No Peptizer | | | |
|---|---|---|---|---|---|---|---|---|---|---|---|---|---|---|---|---|---|---|---|---|
| Mix Time, min | 0 | 2 | 5 | 10 | 0 | 2 | 5 | 10 | 0 | 2 | 5 | 10 | 0 | 2 | 5 | 10 | 0 | 2 | 5 | 10 |
| Dump Temp., °F | | 260 | 260 | 240 | | 270 | 260 | 240 | | 260 | 250 | 230 | | 270 | 240 | 230 | | 270 | 250 | 240 |
| Power, Watts | 590 | 400 | 300 | 270 | 570 | 360 | 290 | 260 | 600 | 400 | 300 | 280 | 560 | 380 | 300 | 280 | 600 | 400 | 360 | 340 |
| Inherent Viscosity | 2.63 | | 2.04 | 1.93 | 2.50 | 2.32 | 2.20 | 1.89 | 2.49 | 2.18 | 2.07 | 1.86 | 2.29 | 2.29 | 1.94 | 1.84 | 2.43 | 2.38 | 2.28 | 2.40 |

[a] Mooney Value 49 at 212° F., 95.7% cis, 1.7% trans, 2.6% vinyl.
[b] Zinc salt of pentachlorothiophenol containing iron phthalocyanine.

The heat build-up in the polymers from mastication as indicated by the dump temperatures was substantially the same in all the runs for equivalent mixing times. Also the results obtained using two parts of the peptizer were not greatly different from the results obtained with only one part. The data show that cadmium thiobenzoate produces peptizing results which are at least equivalent and in some cases better than those obtained using a known peptizing agent belonging to a different chemical classification. As compared to the rubber containing no additive the cadmium thiobenzoate is shown to be a highly effective peptizing agent for a cis-polybutadiene.

EXAMPLE II

Polybutadiene similar to that employed in Example I was masticated in a series of runs for 6 minutes in a Brabender plastograph operated at 100 r.p.m. and with a jacket temperature of 212° F. A run was made with no peptizing agent and several runs were made with one part thereof, and masticating the resulting mixture in the presence of air.

3. The method of claim 2 wherein said compound is cadmium thio-1-naphthenate.

4. The method of claim 2 wherein said compound is cadmium thio-p-methylbenzoate.

5. A method of improving the processability of cis-polybutadiene which comprises mixing with 100 parts by weight of said polybutadiene about 1 to 2 parts by weight of a compound having the formula

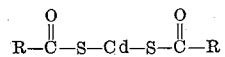

wherein each R is selected from the group consisting of phenyl, naphthyl and lower alkyl substituted derivatives thereof, and masticating the resulting mixture in the presence of air for at least 3 minutes.

6. The method of claim 5 wherein said compound is cadmium thiobenzoate.

7. The method of claim 5 wherein said mastication is carried out for 5 to 15 minutes.

References Cited by the Examiner
UNITED STATES PATENTS

| | | | |
|---|---|---|---|
| 2,223,085 | 11/1940 | Williams et al. | 260—761 |
| 2,626,248 | 1/1953 | Brown | 260—94.7 |
| 2,775,639 | 12/1956 | Lober et al. | 260—30.8 |

OTHER REFERENCES

Barron: "Modern Rubber Chemistry," Van Nostrand Co., Inc. (1948), p. 149.

JOSEPH L. SCHOFER, *Primary Examiner.*

JAMES A. SEIDLECK, *Examiner.*

C. R. REAP, *Assistant Examiner.*